(12) United States Patent
Kudou et al.

(10) Patent No.: US 9,020,245 B2
(45) Date of Patent: Apr. 28, 2015

(54) TRAINING DEVICE, TRAINING SYSTEM AND METHOD

(75) Inventors: Daigo Kudou, Shizuoka (JP); Masanori Sambe, Shizuoka (JP); Takesi Kawaguti, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 171 days.

(21) Appl. No.: 13/367,425

(22) Filed: Feb. 7, 2012

(65) Prior Publication Data
US 2012/0213428 A1     Aug. 23, 2012

(30) Foreign Application Priority Data

Feb. 21, 2011   (JP) ................................. 2011-034606

(51) Int. Cl.
*G06K 9/62*   (2006.01)
*G09B 5/06*   (2006.01)
*G09B 7/02*   (2006.01)
*G07G 1/12*   (2006.01)

(52) U.S. Cl.
CPC .. *G09B 5/06* (2013.01); *G07G 1/12* (2013.01); *G09B 7/02* (2013.01)

(58) Field of Classification Search
None
See application file for complete search history.

(56) References Cited

U.S. PATENT DOCUMENTS

| | | | | |
|---|---|---|---|---|
| 5,286,202 A * | 2/1994 | de Gyarfas et al. | ............. | 434/43 |
| 5,602,982 A * | 2/1997 | Judd et al. | ..................... | 715/709 |
| 7,797,146 B2 * | 9/2010 | Harless et al. | .................. | 703/12 |
| 2003/0228560 A1 * | 12/2003 | Seat et al. | ....................... | 434/219 |
| 2005/0004789 A1 * | 1/2005 | Summers | ........................ | 703/22 |
| 2005/0239035 A1 * | 10/2005 | Harless et al. | ................ | 434/350 |
| 2006/0121423 A1 * | 6/2006 | Hutchison | ..................... | 434/219 |
| 2007/0243517 A1 * | 10/2007 | Olsen | ............................. | 434/365 |
| 2008/0160492 A1 * | 7/2008 | Campbell et al. | ............. | 434/379 |
| 2008/0254419 A1 * | 10/2008 | Cohen | ............................ | 434/219 |
| 2008/0254423 A1 * | 10/2008 | Cohen | ............................ | 434/308 |
| 2008/0254424 A1 * | 10/2008 | Cohen | ............................ | 434/308 |

(Continued)

FOREIGN PATENT DOCUMENTS

| JP | 2002-258736 | 9/2002 |
|---|---|---|
| JP | 2004-287499 | 10/2004 |

(Continued)

OTHER PUBLICATIONS

English Translation of Decision of a Patent Grant for Application No. 2011-034606 Dated Jan. 29, 2013, 3 pgs.

*Primary Examiner* — Stephen R Koziol
*Assistant Examiner* — Jonathan S Lee
(74) *Attorney, Agent, or Firm* — Amin, Turocy & Watson, LLP

(57) ABSTRACT

A training device comprises a first regenerating unit regenerates at least one of an image and a voice for training during the training courses which lead the user to train the operation of an input device, an operation accepting unit accepts the user operation for at least one of the image and the voice for training from a simulated user interface which simulates a user interface of the input device during training, a second regenerating unit regenerates at least one of the image and the voice for training when the training is ended, and a normal operation instructing unit instructs a normal operation to the user by outputting at least one of the image and the voice of the normal operation of the user, which show at least one of the image and the voice for training, which is synchronous with the regeneration of the second regenerating unit.

7 Claims, 13 Drawing Sheets

(56) References Cited

U.S. PATENT DOCUMENTS

| | | | |
|---|---|---|---|
| 2008/0254425 A1* | 10/2008 | Cohen | 434/308 |
| 2008/0254426 A1* | 10/2008 | Cohen | 434/308 |
| 2010/0028845 A1* | 2/2010 | Myer et al. | 434/323 |
| 2010/0028846 A1* | 2/2010 | Cohen et al. | 434/323 |
| 2011/0008758 A1* | 1/2011 | Kortas et al. | 434/219 |
| 2011/0207096 A1* | 8/2011 | Kawaguti et al. | 434/219 |
| 2012/0148990 A1* | 6/2012 | Kawaguti et al. | 434/219 |

FOREIGN PATENT DOCUMENTS

| | | |
|---|---|---|
| JP | 2005-216227 | 8/2005 |
| JP | 2006-099075 | 4/2006 |
| JP | 2009-199188 | 9/2009 |

\* cited by examiner

FIG. 3

| TITLE | REQUIRED TIME | LEVEL | DYNAMIC IMAGE FILENAME | SPECIFIED ORDER ITEMS | REVIEW SETTING FILENAME |
|---|---|---|---|---|---|
| ONE CUSTOMER | 5 MINUTES | PRIMARY CLASS | HITORI.MPG | MORNING TEA, COFFEE... | REVIEW_HITORI.CONFIG |
| TAKEOUT | 5 MINUTES | PRIMARY CLASS | TAKEOUT.MPG | HIGH-CLASS PIZZA... | REVIEW_TAKEOUT.CONFIG |
| FAMILY | 5 MINUTES | INTERMEDIATE CLASS | FAMILY.MPG | CHILDREN LUNCHEONETTE | REVIEW_FAMILY.CONFIG |
| TWO CUSTOMERS | 5 MINUTES | INTERMEDIATE CLASS | FUTARI.MPG | RECOMMENDATORY PASTA... | REVIEW_FUTARI.CONFIG |
| BANQUET | 5 MINUTES | HIGH CLASS | ENKAI.MPG | LONG DRINK... | REVIEW_ENKAI.CONFIG |
| BIG PARTY | 5 MINUTES | HIGH CLASS | PARTY.MPG | LONG DRINK... | REVIEW_PARTY.CONFIG |
| CLAIM ANSWER | 5 MINUTES | ETIQUETTE | CLAIM.MPG | — | REVIEW_CLAIM.CONFIG |
| APPEARANCE DECORATION | 5 MINUTES | ETIQUETTE | MIDASHI.MPG | — | REVIEW_MIDASHI.CONFIG |
| WORDING | 5 MINUTES | ETIQUETTE | KOTOBA.MPG | — | REVIEW_KOTOBA.CONFIG |

FIG.4

| USER NAME | END FLAG | | | | | | | | SKILL LEVEL |
|---|---|---|---|---|---|---|---|---|---|
| | ONE CUSTOMER | TAKEOUT | FAMILY | TWO CUSTOMERS | BANQUET | BIG PARTY | CLAIM ANSWER | APPEARANCE DECORATION | WORDING | |
| SHOP ASSISTANT A | 1 | 1 | 1 | 0 | 0 | 0 | 0 | 1 | 0 | WORKING PRIMARY CLASS |
| SHOP ASSISTANT B | 1 | 0 | 0 | 0 | 0 | 0 | 0 | 0 | 0 | NOVICIATE |
| ... | ... | ... | ... | ... | ... | ... | ... | ... | ... | ... |

| REGENERATING TIME | EVENT |
|---|---|
| 00:10 | 'ICED COFFEE' KEY. FLASH AT 1 SECOND |
| 00:15 | 'MOCHA' KEY. FLASH AT 1 SECOND |
| ⋮ | ⋮ |

TRAINING DEVICE, TRAINING SYSTEM AND METHOD

CROSS-REFERENCE TO RELATED APPLICATION

This application is based upon and claims the benefit of priority from Japanese Patent Application No. 2011-034606, filed Feb. 21, 2011, the entire contents of which are incorporated herein by reference.

FIELD

Embodiments described herein relate generally to a training device, a training system and a method.

BACKGROUND

A processing device executes the processing relevant to various services of menu items such as an order accepting service or a settlement service and the like in most restaurants such as a family restaurant or a wine house, etc.

Furthermore, the processing device inputs the operation of a user such as a shop assistant and the like by an input device and executes the processing which corresponds to the input of user.

Specifically, in the case of a system which is used in the restaurant, the input device and the processing device are respectively to be an order terminal and a base station (a server) for instance. Furthermore, the operation which appoints the menu items ordered by a customer is input in the order terminal at present. The order terminal generates order accepting information which includes a list of the ordered menu items according to the input operation and transmits the order accepting information to the base station. The base station generates a cooking instructing slip or manages the sales and the like according to the order accepting information.

DESCRIPTION OF THE DRAWINGS

FIG. 3 is a diagram modularly showing an example of a training course database.

FIG. 4 is a diagram modularly showing an example of a training situation database.

DETAILED DESCRIPTION

According to one embodiment, a training device comprises a first regenerating unit, an operation accepting unit, a second regenerating unit and a normal operation instructing unit. The first regenerating unit regenerates at least one of an image and a voice for training during the training courses which lead the user to train the operation of an input device. The operation accepting unit accepts the user operation for at least one of the image and the voice for training from a simulated user interface which simulates a user interface of the input device during training. The second regenerating unit regenerates at least one of the image and the voice for training when the training is ended. The normal operation instructing unit instructs a normal operation to the user by outputting at least one of the image and the voice of the normal operation of the user, which show at least one of the image and the voice for training, which is synchronous with the regeneration of the second regenerating unit.

Figure 1:
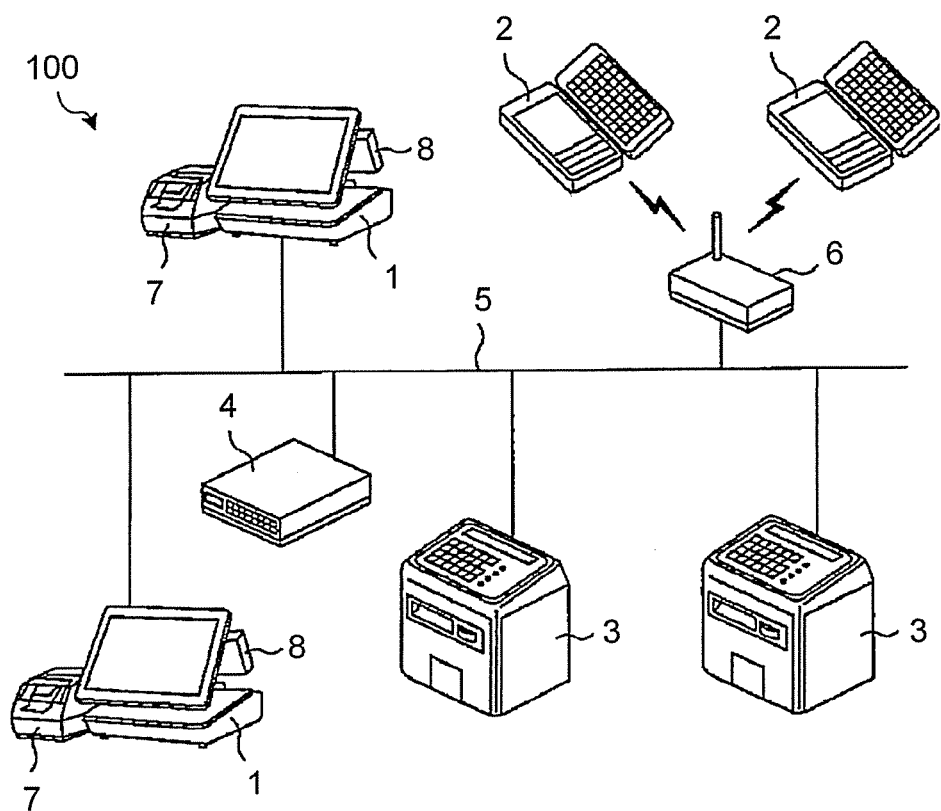
FIG. 1 is a structure diagram of an order processing system related to an embodiment.

FIG. 1 is a structure diagram of an order processing system 100 related to the embodiment.

The order processing system 100 can be used in various facilities where the food service or the commodity sales service is provided according to an order of the customer in many places such as the restaurant or the shop, etc. However, the order processing system 100 which is used in the restaurant is illustrated.

The order processing system 100 connects a plurality of information terminals 1, a plurality of handheld terminals 2, a plurality of slip printers 3 and a base station 4 to an LAN (Local Area Network) 5 respectively. However, the handheld terminals 2 are connected with the LAN 5 by a plurality of wireless access points 6. The number of the information terminals 1, the handheld terminals 2 and the slip printers 3 can be respectively to be two at random as shown in FIG. 1. The number of the information terminals 1, the handheld terminals 2 and the slip printers 3 also can be one.

The information terminals are disposed at a customer service floor or a checkout counter for instance to process various services for the customer such as the guidance service, the ordering service, the assistant (set on the table) service or the settlement service, etc. Furthermore, the information terminals 1 which are disposed in the customer service floor are mainly used for processing the guidance service, the ordering service and the assistant (set on the table) service. Furthermore, the information terminals 1 which are disposed in the checkout counter are mainly used for processing the settlement service. In addition, the information terminals 1 also can be used for special purposes only by means of the processing which is relevant to some services.

Furthermore, at least one of the information terminals 1 has a training function capable of training the operation in the handheld terminals 2 to be used as a training device.

Each handheld terminal 2 comprises a user interface which is used for arranging a plurality of operational keys such as a plurality of soft key or a plurality of hard keys and the like. Each handheld terminal 2 is used as the input device which is used for inputting the user operation for inputting the order by the user interface. Each handheld terminal 2 generates order information according to the input operation and wirelessly transmits the order information. The order information witlessly transmitted by each handheld terminal 2 is transmitted to the base station 4 by the wireless access points 6 and the LAN 5.

The slip printers 3 are disposed at the customer service floor or a kitchen for instance. The slip printers 3 which are disposed at the customer service floor are used for printing an order slip based on the order information for the customer, i.e. the slip printers 3 which are disposed at the customer service floor are used as the so-called customer printers. Furthermore, the slip printers 3 which are disposed at the kitchen are used for printing a cooking instructing slip based on the order information for the cooker, i.e. the slip printers 3 which are disposed at the kitchen are used as the so-called kitchen printers.

The base station 4 is disposed at a back-yard for instance to accumulate all kinds of information transmitted by the information terminals 1 and process the management service relevant to the business of the restaurant. The base station 4 is further used for managing the information shared by the information terminals 1.

The order information which is generated in the information terminals 1 or the handheld terminals 2 according to the operation of the user is transmitted to the base station 4 from the LAN 5 when the user inputs the order by the information terminals 1 or the handheld terminals 2. The base station 4 is used managing the transmitted order information such as the settlement or the accumulation, etc. Furthermore, the base station 4 is used for transmitting the order information to the slip printers 3 via the LAN 5. The slip printers 3 are used for printing the cooling instructing slip or the order slip which corresponds to the content of the transmitted order information.

Figure 2:
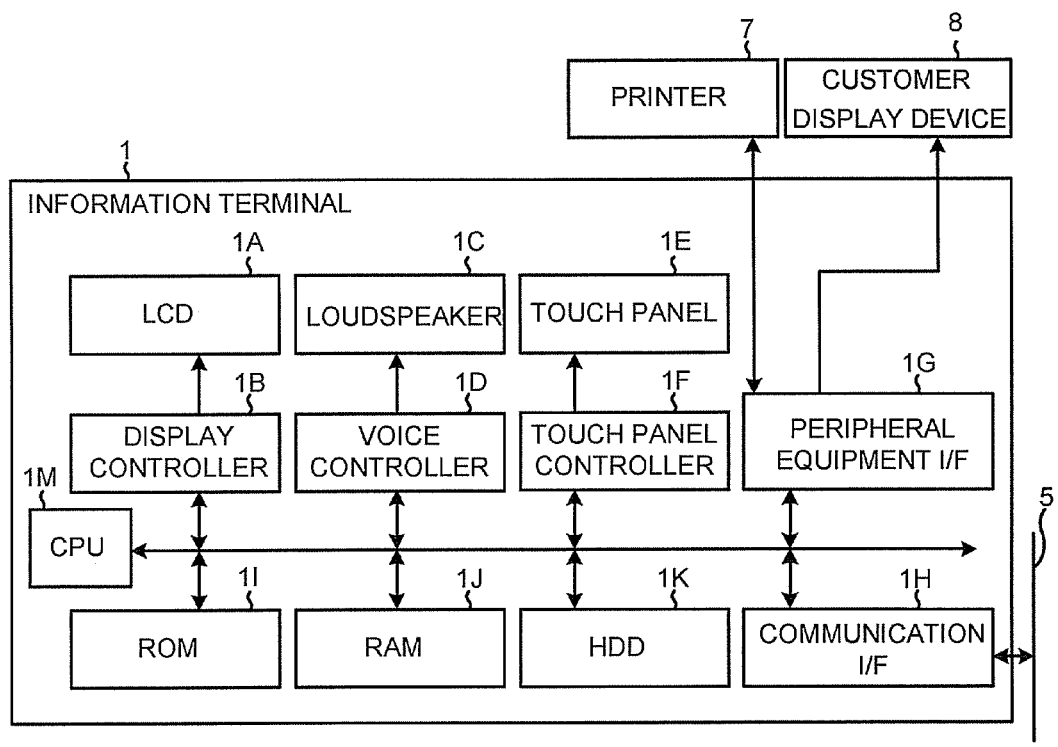
FIG. 2 is a block diagram showing the structure of each information terminal.

FIG. 2 is a block diagram showing the structure of each information terminal 1.

Each information terminal 1 comprises an LCD (liquid crystal display) 1a, a display controller 1b, a loudspeaker 1c, a voice controller 1d, a touch panel 1e, a touch panel controller 1f, a peripheral equipment I/F (interface) 1g, a communication I/F (interface) 1h, a ROM (read only memory) 1i, a memory unit RAM (random access memory) 1j, an HDD (hard disk drive) 1k and a CPU (central processing unit) 1m. The display controller 1b, the voice controller 1d, the touch panel controller 1f, the peripheral equipment I/F 1g, the communication I/F 1h, the ROM 1i, the RAM 1j, the HDD 1k and the CPU 1m are respectively connected with a bus line. The LCD 1a, the loudspeaker 1c and the touch panel 1e are respectively connected with the display controller 1b, the voice controller 1d and the touch panel controller 1f.

The LCD 1a is driven by the display controller 1b to display an image. The display controller 1b drives the LCD 1a to display the image which corresponds to the image data transmitted under the control of the CPU 1m.

The loudspeaker 1c regenerates the voice driven by the voice controller 1d. The voice controller 1d drives the loudspeaker 1c to regenerate the voice which corresponds to the voice data transmitted under the control of the CPU 1m.

The touch panel 1e is disposed on a display surface of the LCD 1a in a laminating way. The touch panel 1e outputs a detection signal which corresponds to a touch position of the user when the user touches a display picture of the LCD 1a. The touch panel controller 1f obtains coordinate information which shows the touch position according to the detection signal output by the touch panel 1e and transmits the coordinate information to the CPU 1m. The touch panel 1e is used as one of the input devices for inputting the user operation for training during training.

The peripheral equipment I/F 1g is connected with the peripheral equipment such as a printer 7 or a customer display device 8 as required. The peripheral equipment I/F 1g is communicated with the connected peripheral equipment. The peripheral equipment I/F 1g can use an interface circuit and the like according to the general specification of a USB (universal Serial bus). Furthermore, the printer 7 is used for printing an order slip, a receipt slip, various daily papers, etc. The customer display device 8 is used for displaying the image which shows the settlement result or the advertisement information and the like to the customer. At least one of the printer 7 and the customer display device 8 further can be disposed in the information terminals 1.

The communication I/F 1h is communicated with the slip printers 3 and the base station 4 by the LAN 5. The communication I/F 1h can use an interface circuit and the like according to the general specification of the Ethernet network (registered trademark), etc.

The ROM 1i memorizes a program which records the processing Acts of the CPU 1m or the data for the CPU 1m to execute various processes as required, etc.

The RAM 1j memorizes the data for the CPU 1m to execute various processes as required. For example, the RAM 1j memorizes the image information showing the image displayed in the LCD 1a. Furthermore, the RAM 1j further can be used as a work region when the CPU 1m executes various processes.

The HDD 1k memorizes a program which records the processing Acts of the CPU 1m or the data for the CPU 1m to execute various processes as required, etc. The HDD 1k memorizes a database which is relevant to the menu items provided by the restaurant provided with the order processing system 100.

Furthermore, the HDD 1k memorizes a training course database (referring to FIG. 3).

And then, the training course database is illustrated with reference to FIG. 3. FIG. 3 is a diagram modularly showing an example of a training course database. The training course database memorizes the data which is relevant to the training courses for the user to train the operation of the input device (for example, the handheld terminals 2). As shown in FIG. 3, each training course in the training course database comprises the information fields relevant to the title, the required time, the level, the dynamic image filename, the specified order items and the review setting filename.

The information recorded in the information field relevant to the tile shows the tile for identifying the training courses. The information recorded in the information field relevant to the required time shows the required time of the training. The information recorded in the information field relevant to the level shows the in formation which shows the difficulty. The information recorded in the information field relevant to a dynamic image filename shows an identifying name of a dynamic image file which should be used. The information recorded in the information field relevant to the specified order items shows the items which should be input as the order items. The information recorded in the information field relevant to the review setting filename shows an identifying name for setting the recorded review setting file generated aiming at the review which corresponds to each training course.

Furthermore, the HDD 1K memorizes a plurality of dynamic image files of each training course generated when the processing is trained.

Furthermore, the HDD 1K memorizes the training situation database which records the training situation of each shop assistant (referring to FIG. 4).

And then, the training situation database is illustrated with reference to FIG. 4. FIG. 4 is a diagram modularly showing an example of a training situation database. As shown in FIG. 4, the training situation database comprises and records the data record which corresponds to each user (herein, is the shop assistant)

Each data record includes the information field relevant to the username, the end-flag of each training course and the skill level. The information recorded in the information field relevant to the username shows the name for identifying the user. The end-flag shows the end situation of the training in each training course by any one of 0 (not ended) and 1 (ended). The information recorded in the information field relevant to the skill level shows the skill level about the skill level of the operation of the handheld terminals 2.

The HDD 1K is memorizes the date relevant to each image displayed on the LCD 1a. And then, the display picture used in each training course is illustrated.

Figure 5:
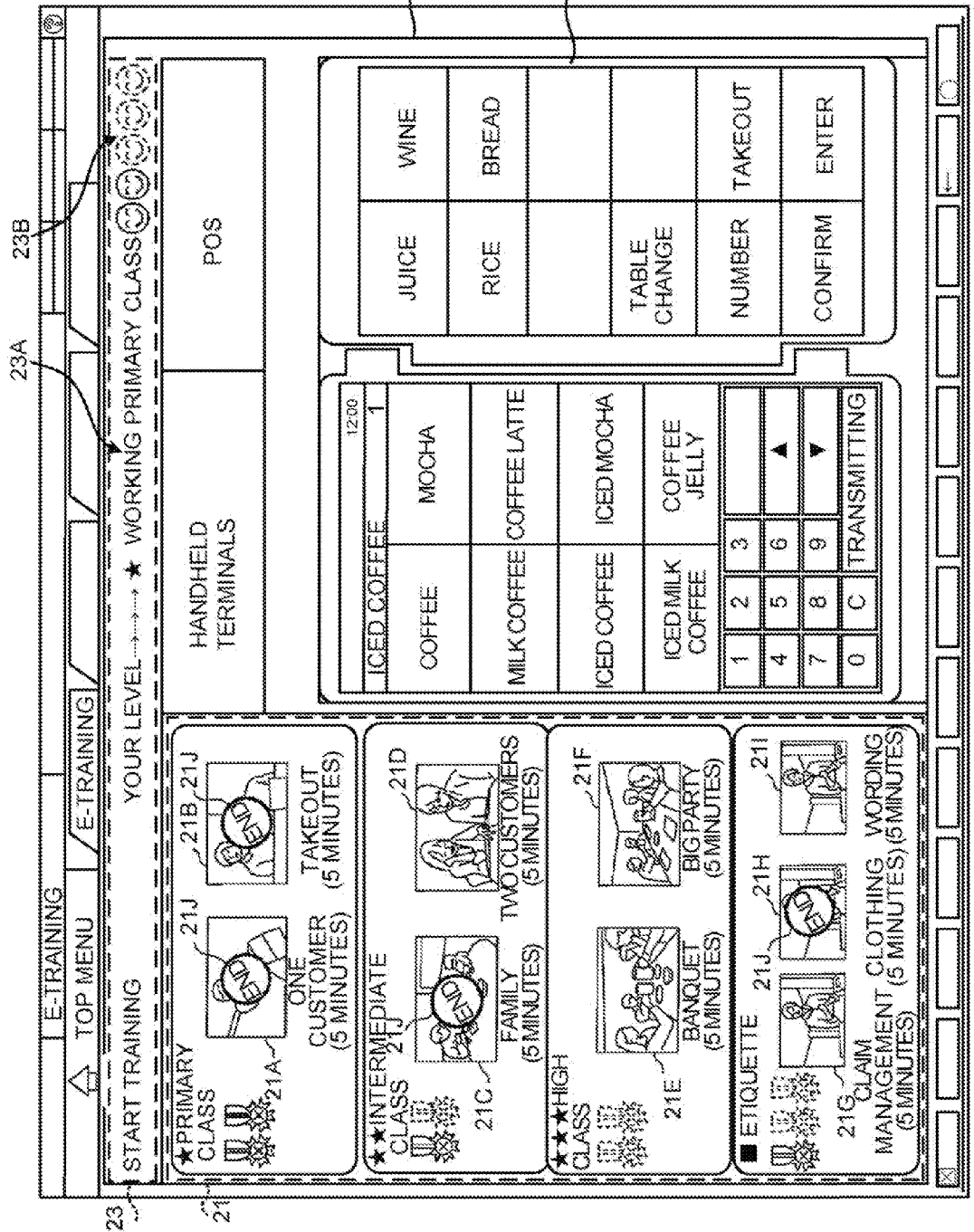
FIG. 5 is a diagram showing an example which includes a display picture of a course selecting image.

Firstly, a course selecting image 20 is illustrated with reference to FIG. 5. FIG. 5 is a diagram showing an example which includes a display picture of a course selecting image 20. The course selecting image 20 comprises a course browsing image 21, an input interface image 22 and a guidance image 23.

The course browsing image 21 shows the browse of the training courses registered in the training course database (referring to FIG. 3). In the example of FIG. 5, the course browsing image 21 comprises a plurality of dynamic image thumbnails 21a, 21b, 21c, 21d, 21e, 21f, 21g, 21h and 21i of each training course. The course browsing image 21 comprises a text which shows the title and the required time of each training course under each dynamic image thumbnail 21a-21i. Furthermore, the course browsing image 21 respectively shows each dynamic image thumbnail 21a-21i according to each level of each training course.

Furthermore, the course browsing image 21 comprises the end mark 21j showing the end of the training under the state that the dynamic image thumbnails of the training courses where the end mark recorded in the user training situation database (referring to FIG. 4) relevant to the acceptance of the training courses is changed to be flag '1' are overlapped. In the training situation database as shown in FIG. 4, the situation that the user end mark of the 'Shop assistant A' changes to be flag '1' means each training course of 'One customer', 'Takeout', 'Family' and 'Clothing'. FIG. 5 sequentially comprises the end marks 21j under the state that the dynamic image thumbnails 21a, 21b, 21c and 21h relevant to each training process of 'One customer', 'Takeout', 'Family' and 'Clothing' are respectively overlapped with each other.

The input interface image 22 is an image which simulates the user interface of each handheld terminal 2.

The guidance image 23 comprises an alphabetic string 23a and mark 23b, which show the skill level of the user.

Figure 6:
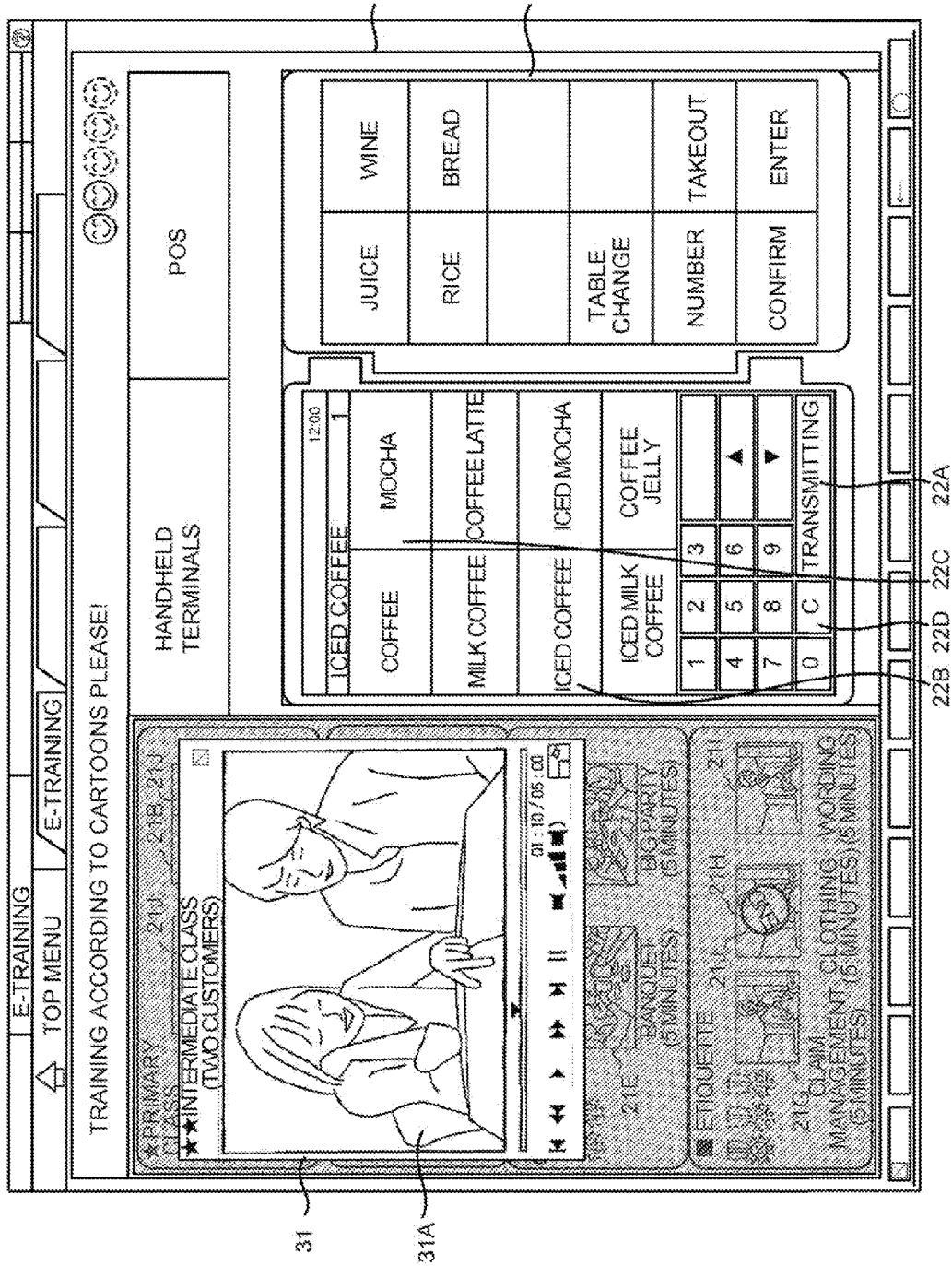
FIG. 6 is a diagram showing an example which includes a display picture of a training image.

And then, a training image 30 is illustrated with reference to FIG. 6. FIG. 6 is a diagram showing an example which includes a display picture of a training image 30.

The training image 30 comprises a player image 31 in the course selecting image 20 under the state that the course browsing image 21 is overlapped. The player image 31 comprises a dynamic image 31a. Furthermore, the CPU 1m sequentially selects a plurality of image frames which are showed by the dynamic image files one by one at intervals to be taken as a plurality of display objects and automatically changes to be the image frames which take the dynamic image 31a as the display object. The dynamic image and voice, which are showed by the dynamic image file, show a plurality of phenomena that the opportunity that the user should input the menu items in the handheld terminals 2 is changed along with the time. The dynamic image and voice specifically show the situation ordered by a photographing customer or a cartoon under the same situation, etc.

The user inputs the items of the ordered menu items by touching and selecting the keys of the menu items (the images displayed on the input interface image 22) configured on the input interface image 22 according to the dynamic image displayed in the LCD 1a and the voice regenerated in the loudspeaker 1c. The inputting operation of the items further comprises the Act of eliminating the input menu items. Furthermore, the user ends the operation by touching a transmitting key 22a configured in the input interface image 22 when the user regards that all ordered items has been input.

Figure 10:
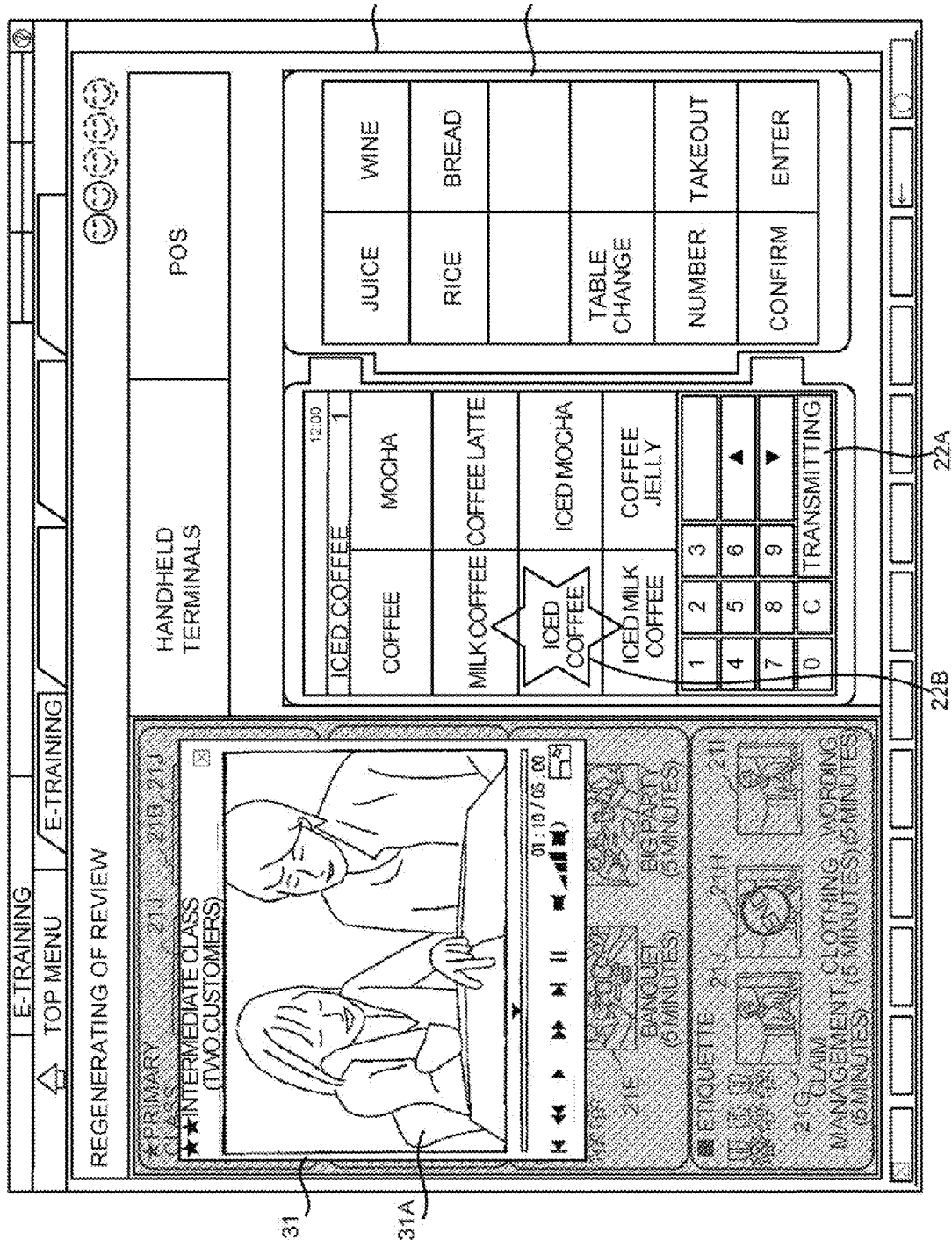
FIG. 10 is a diagram showing an example which includes a display picture of a review image.
Figure 11:
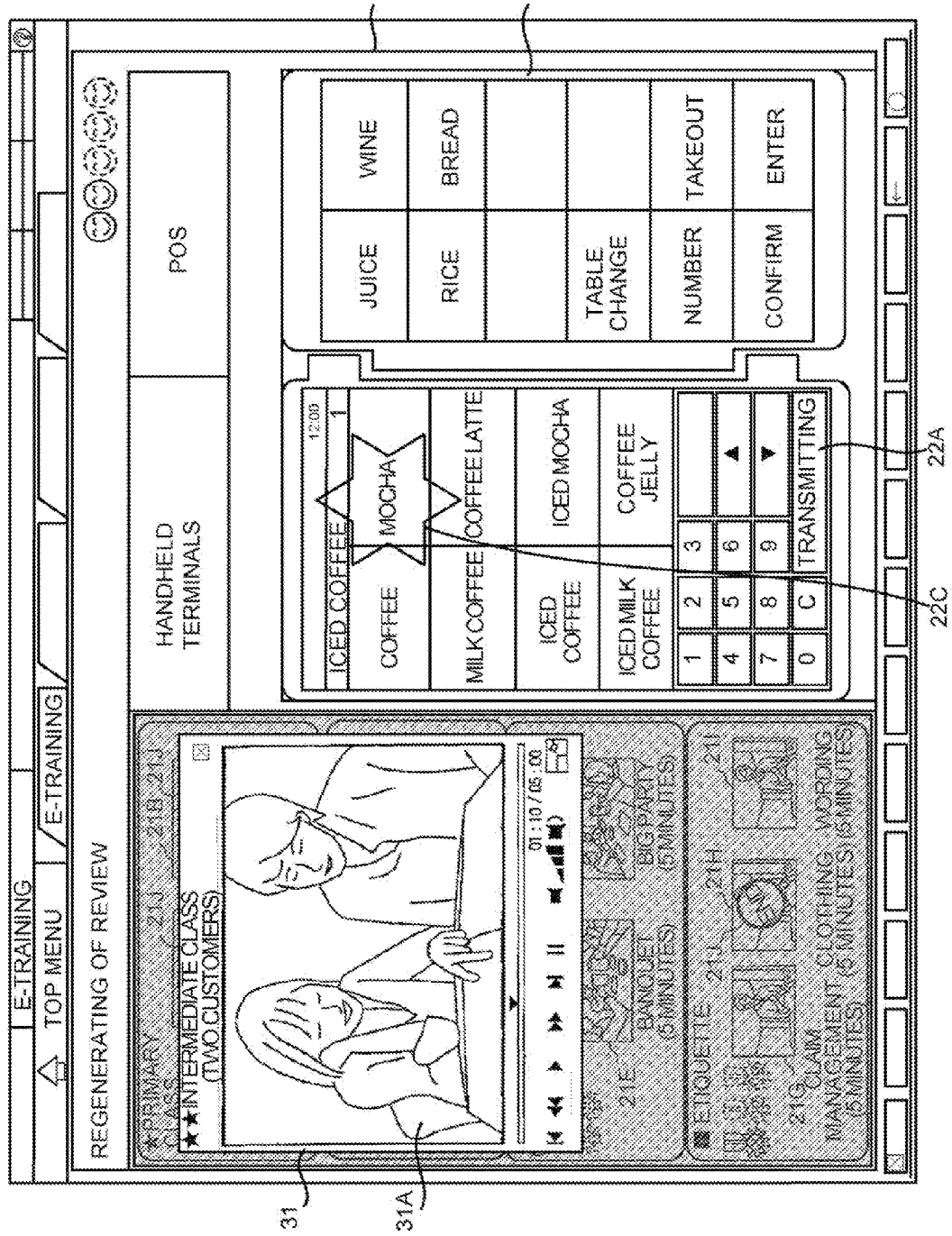
FIG. 11 is a diagram showing an example which includes a display picture of a review image.

Furthermore, the HDD 1k memorizes and sets a review setting file (referring to FIG. 7) of the information relevant to a review image 40 (referring to FIG. 10 and FIG. 11).

Herein, the review image 40 is an image regenerated for reviewing the training courses after the training of each training course is ended.

FIG. 10 and FIG. 11 are respectively to be a diagram showing an example which includes a display picture of a review image 40. As show in FIG. 10 and FIG. 11, the review image 40 mainly consists of the player image 31 and the input interface image 22. The input interface image 22 of the review image 40 shows the normal operation which should by operated by the user in each training course. Furthermore, the regenerating method of the review image 40 not only can be used for mapping but also can be used for regenerating at least one of the dynamic image, the still image and the voice.

Figures 7, 8:
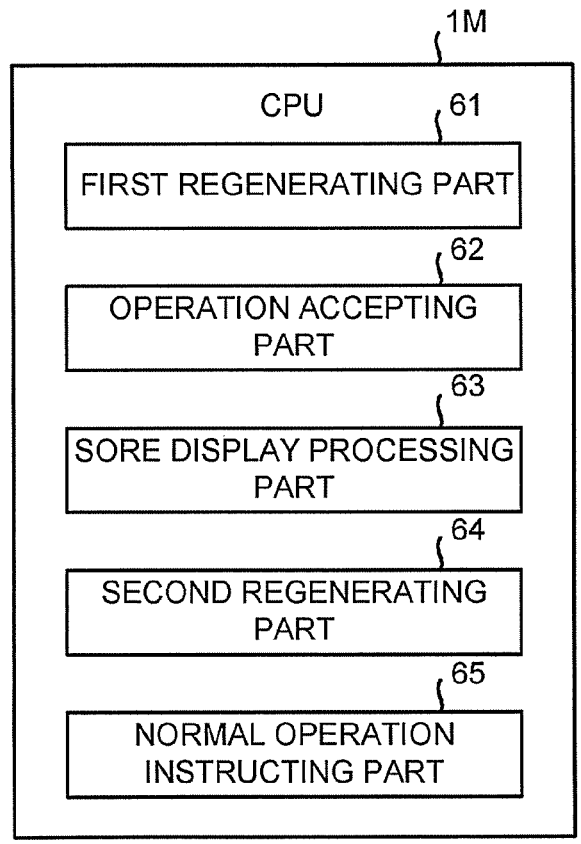
FIG. 7 is a diagram showing an example of information recorded in a review setting file.
FIG. 8 is a functional block diagram showing the functional structure of each information terminal.

And then, the review setting file is illustrated. FIG. 7 is a diagram showing an example of information recorded in a review setting file. As shown in FIG. 7, the review setting file comprises the regenerating time and an event regenerated within the time of the regenerating time.

Herein, the regenerating time corresponds to that of the dynamic image file of each training course. Furthermore, the event refers to the output operation which shows the opportunity phenomena (such as the ordering behavior of the customer and the like) which is regenerated in the dynamic file within the regenerating time and the normal operation (such as the input operation of the order and the like) which should be executed by the user to the user. The event refers to the emphatically-displayed key set within the regenerating time and an emphatic displaying method (the flash of the key and the like) for instance. Furthermore, the event also refers to the voice input within the regenerating time.

For example, the dynamic image file 'Futari.mpg' corresponds to the review setting file 'review_Futari.config' in the training situation database as shown in FIG. 3. Therefore, each event and the regenerating time thereof are set corresponding to the regenerating time of the dynamic image file 'Futari.mpg' in the review setting file 'review_Futari.config'.

For example, the user orders the iced coffee when the regenerating time of the dynamic image is set at 00:10 and orders the mocha when the regenerating time of the dynamic image is set at 00:15 in the dynamic image file 'Futari.mpg'.

Currently, the normal operation which should be executed by the user within the specified time from the regenerating time at 00:10 is the operation of the key 22b (referring to FIG. 6) for selecting the 'iced coffee' in the input interface image 22. Furthermore, the normal operation which should be executed by the user within the specified time from the regenerating time at 00:15 is the operation of the key 22c (referring to FIG. 6) for selecting the 'mocha' in the same image. Herein, the specified time can be set after the user operation time such as 5 seconds, etc.

Therefore, the event that leads the key 22b of the 'iced coffee' to flash at one second (referring to FIG. 10) is set in the input interface image 22 in the review setting file as shown in FIG. 6 when the regenerating time is set to be 00.10. Furthermore, the event that leads the key 22c of the 'mocha' to flash at one second (referring to FIG. 11) is set in the input interface image 22 when the regenerating time of the dynamic image is set to be 00.15.

In FIG. 1, the CPU 1m executes each processing relevant to each service or the training of the embodiment according to the program memorized in the ROM 1i or the HDD 1k.

FIG. 8 is a functional block diagram showing the functional structure of each information terminal 1. As shown in FIG. 8, the CPU 1m (the processor) is used for reading and executing the program of the embodiment from the ROM 1i or the HDD 1k to play the function of the first regenerating unit 61, the operation accepting unit 62, the score display processing unit 63, the second regenerating unit 64 and the normal operation instructing unit 65.

The first regenerating unit 61 regenerates the dynamic image file of each training course in the training image 30 (referring to FIG. 6) when each training course is executed.

For example, the situation where the tile of the training course is selected to be 'Two customers' in the course browsing image 21 (referring to FIG. 5) is illustrated. Currently, the first regenerating unit 61 starts the training with the tile of 'Two customers'

That is, the regenerating unit 61 obtains the 'Futari.mpg' from the training course database (referring to FIG. 3) to be taken as the dynamic image filename which corresponding to the training courses, generates the training image 30 which comprises the dynamic image 31a based on the dynamic image file memorized in the HDD 1k by the filename, and instructs the display controller 1b to regenerate the training image 30. According to the instruction, the display controller 1b drives the LCD 1a to generate the corresponding training image 30. Furthermore, the CPU 1m instructs the voice controller 1d to regenerate the voice which corresponds to the voice date included in the dynamic image file. According to the instruction, the voice controller 1d drives the loudspeaker 1c to regenerate the corresponding voice.

Furthermore, each training course not only can be executed by regenerating the dynamic image file but also can be executed by regenerating at least one of the dynamic image, the still image and the voice for training.

The operation accepting unit 62 accepts the user operation which corresponds to the dynamic image 31a regenerated in the LCD 1a and the voice regenerated in the loudspeaker 1c from the imputer user interface image 22 when each training course is executed.

That is, the operation accepting unit 62 accepts the input operation which appoints the supplemented items of the menu items which correspond to the key when the operation keys (such as 22b, 22c and the like) are selected in the input user interface image 22 and supplements the corresponding menu items in a menu items list to update a list.

Furthermore, the operation accepting unit 62 accepts the input operation which appoints the eliminated items of the selected menu items when the operation eliminating keys 22b is selected in the input user interface image, eliminates the corresponding menu items from the order item list to update the list, and accepts the end operation which ends the training when the transmitting key 22 of the operation input interface image 22 is selected.

Furthermore, the operation accepting unit 62 further can accept the user operation when the other images (such as the icon, the photograph, the test, etc.) displayed in the user interface image 22 is selected to be input. Furthermore, the information thermals 1 have the functions of a microphone and voice identification and further can accept the user operation by the voice of the user.

The score display processing unit 63 executes the score display processing relevant to the ended training. That is, the score display processing unit 63 obtains the score which shows the degree of correspondence between the user operation and the preset operation according to the input operation of the user which is stopped training or these timing.

Furthermore, the score display processing unit 63 generates a score image 50 (referring to FIG. 9) which displays the obtained score and displays the score image 50 on the display picture by the display controller 1b.

Figure 9:
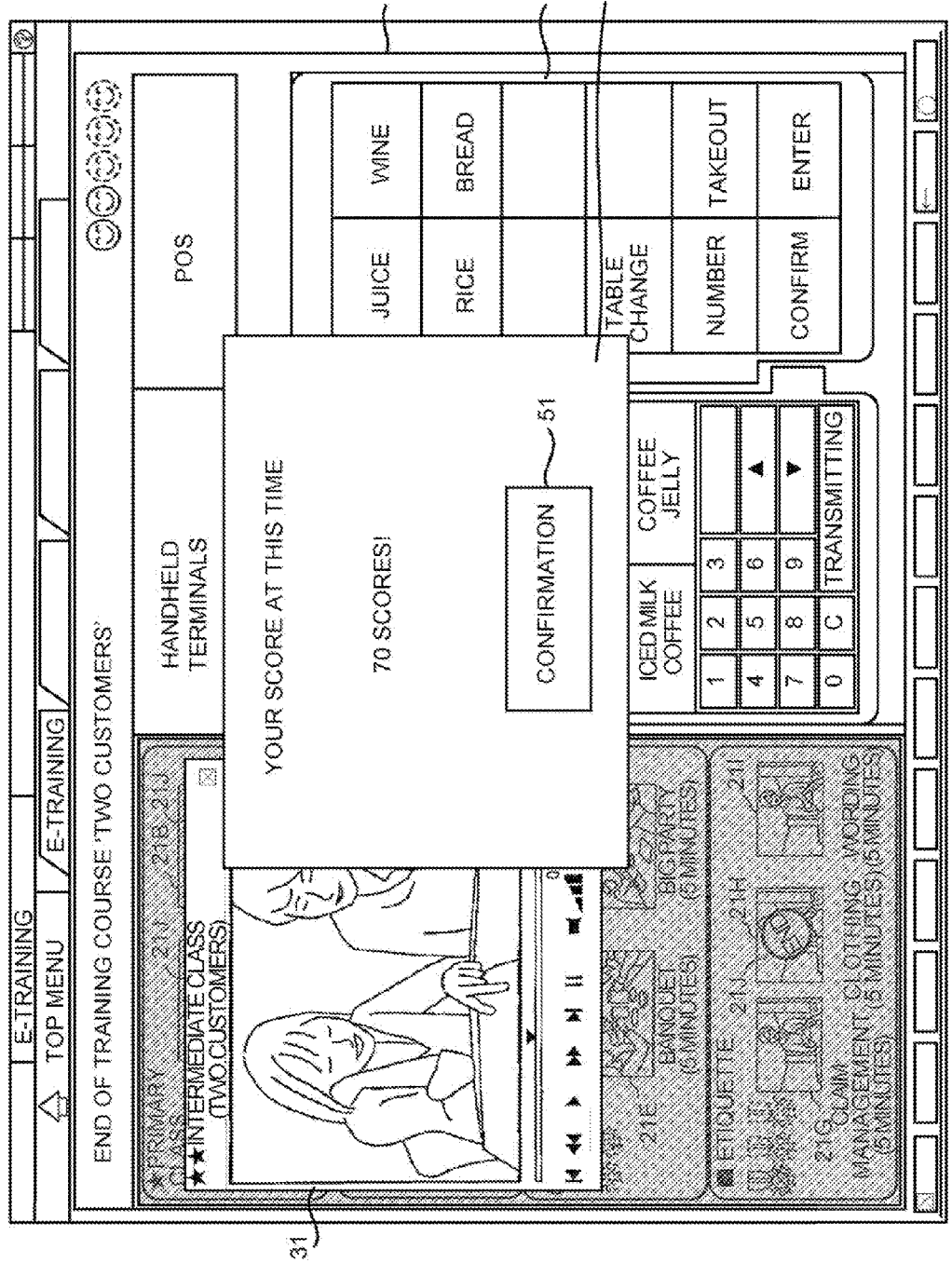
FIG. 9 is a diagram showing an example which includes a display picture of a score image.

FIG. 9 is a diagram showing an example which includes a display picture of a score image. The training image 30 displays the score image 50 in an overlapping way in the example as shown in FIG. 9. The score image 50 is internally provided with a confirming button 51.

Furthermore, the confirming button 51 further can be disposed out of the score image 50 such as on an end picture (not shown in the figures) which informs the user of the end of the training. That is, a review image 40 can be regenerated even if the score is not computed.

The second regenerating unit 64 and the normal operation instructing unit 65 cooperatively regenerate the review image 40 (referring to FIG. 10) of the training courses when the training of each course is ended, i.e. when the confirming button 51 is selectively to be operated in the score image 50.

In addition, the start timing of the regeneration of the review image 40 is not limited to the timing for selecting the confirming button 51. As another example, the review image 40 can be regenerated as soon as the end of the training such as after the regeneration of the dynamic image of each course is ended within a specified time, when all order items of each course have been operated, when the training is forcibly ended, etc.

The second regenerating unit 64 regenerates the dynamic image file of the training courses when the training of each training course is ended, i.e. when the confirming button 51 (referring to FIG. 9) is selectively to be operated.

The normal operation instructing unit 65 is synchronous with the regeneration of the dynamic image file of the second regenerating unit 64 to instruct the normal operation to the user by outputting at least one of the image and the voice, which show the normal operation of the user of the training courses.

And then, the regeneration of the review image 40 is illustrated with reference to FIG. 7, FIG. 10 and FIG. 11.

The second regenerating unit 64 regenerates the dynamic image file 'Futari.mpg' along with the start of the regeneration of the review image (the regenerating time is 00:00 currently). Furthermore, the normal operation instructing unit 65 executes the event which corresponds to 00:10 according to the review setting file as shown in FIG. 7 when the regenerating time is changed to 00:10. That is, the normal operation instructing unit 65 leads the key 22b of the 'iced coffee' to flash at 1 second as shown in FIG. 10.

And then, the normal operation instructing unit 65 executes the event which corresponds to 00:15 according to the review setting file as shown in FIG. 7 when the regenerating time is changed to 00:15. That is, the normal operation instructing unit 65 leads the key 22c of the 'mocha' to flash at 1 second as shown in FIG. 11.

Therefore, the normal operation instructing unit 65 instructs the normal operation to the user by the key which should be selectively operated by the user and emphatically displayed in the input user interface image 22. Furthermore, the normal operation instructing unit 65 not only can be used for leading the keys to flash, but also can be used for emphatically displaying a frame which encloses the keys or displaying the frame in a flashing way for instance, etc.

Figure 12:
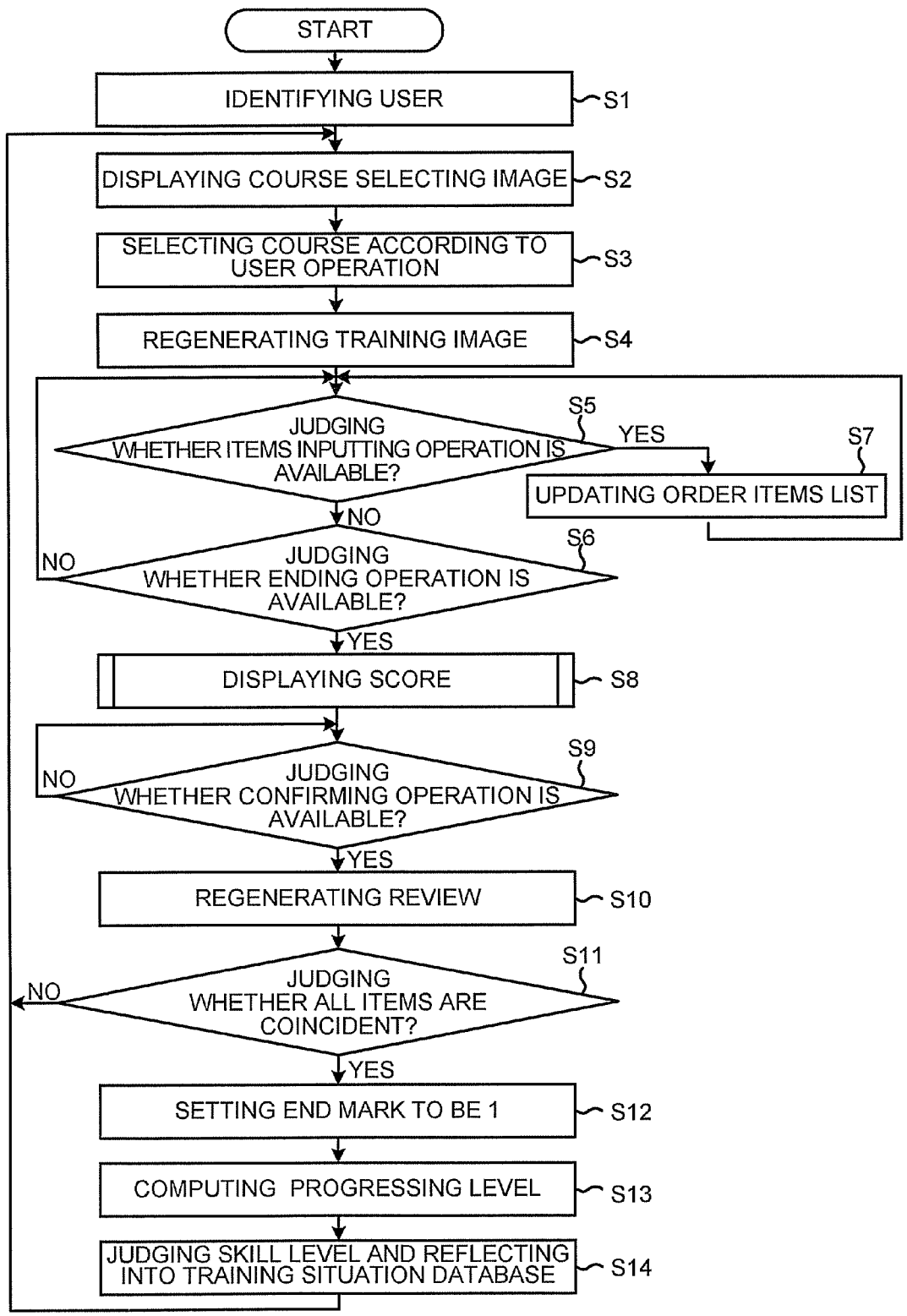
FIG. 12 is a flowchart showing training processing Acts.

And then, the training Acts of the information terminals 1 are illustrated. FIG. 12 is a flowchart showing training processing Acts.

In Act S1, the CPU 1m identifies the user. In Act S2, the CPU 1m generates a course selecting image and instructs the display controller 1b to display the course selecting image. The display controller 1b drives the LCD 1a to display the corresponding course selecting image according to the instruction.

In Act S3, the CPU 1m selects a training course according to the user operation. Specifically, the CPU 1m selects the training course relevant to the touched dynamic thumbnails according to the situation that the user touches one of the dynamic thumbnails 21a-21i included in the course browsing image 21 (referring to FIG. 5). For example, the CPU 1m selects the training course with the tile of 'Two customers' if the user touches the display region of the dynamic image thumbnail 21d in a touch image 5.

The Acts from Act S4 to Act S8 are the processing which is relevant to the training of the selected training course.

In Act S4, the CPU 1m (the first regenerating unit 61) regenerates a dynamic image which corresponds to the selected training course.

In Act S5 and Act S6, the CPU 1m (the operation accepting unit 62) waits for starting or ending the items input operation. Furthermore, the CPU 1m turns into Act S7 from Act S5 if the items have been input. In addition, the CPU 1m also can enter into Act S7 from Act S5 even if the regeneration of the dynamic image is ended or the operation is not ended within a certain time before the preset end timing.

During training, the CPU 1m (the operation accepting unit 62) updates the order item list according to the items input operation accepted from the input user interface image 22 (Act S7).

The CPU 1m turns into Act S8 from Act S6 if the operation is ended under the waiting state of Act S5 and Act S6.

In Act S8, the CPU 1m (the score display processing unit 63) executes the score display processing which is relevant to the ended training and displays the score image 50 (referring to FIG. 9).

Under the state that the score image 50 is displayed, the CPU 1m waits for the conforming operation till that the user exudates the confirming operation (Act S9 is unavailable) (Act S9). Furthermore, the CPU 1m ends the score displaying processing and turns into Act S10 if the user exudates the confirming operation such as the touch of the confirming button 51 and the like (Act S9 is unavailable).

The CPU 1m (the second regenerating unit 64 and the normal operation instructing unit 65) regenerates the review image 40 (Act S10).

In Act S11, the CPU 1m confirms whether all menu items included in the order item list are coincident with the menu items included in the specified order items recorded in the training course database relevant to the currently-selected training course. Furthermore, the CPU 1m turns into Act S12 from Act S11 if all menu items are coincident.

In Act S12, the CPU 1m sets the end mark included in the currently-selected training course and the user training situation database (referring to FIG. 4) identified in Act S1 to be flag '1'.

In Act S13, the CPU 1m computes the progressing level of the training which is relevant to the user identified in Act S1. The progressing level further can be computed according to a preset rule. For example, the progressing level can be obtained according to the quantity of the training course with the end mark of flag '1'. Currently, the progressing level relevant to the user 'Shop assistant A' is changed to be level '4' if the training situation database is under the state as shown in FIG. 4. Or, the progressing level can be obtained to be taken as the sum of a value obtained by multiplying the end mark by the coefficient which corresponds to the difficulty of the training course. That is, for example, according to the level of each training course, the coefficient relevant to 'primary class', 'intermediate class', 'high class' and 'etiquette' are respectively regarded to be '1', '2', '3' and '1', and the progressing level of the user who changes to be 'the shop assistant A' is changed to be level '5' if the training situation database is under the state as shown in FIG. 4.

In Act S14, the CPU 1m judges the skill level according to the progressing level and reflects the skill level into the training situation database (referring to FIG. 4). Specifically, a corresponding relationship between the progressing level and the skill level is preset. In addition, the skill level means the index by which the skill level of the user can be identified such as 'working primary class' or 'working intermediate class'. Furthermore, for example, any change is not added in the training situation database if the skill change of the CPU 1m is not changed even if the progressing level is improved. However, for example, the record of the information field relevant to the training level in the training situation database is changed if the CPU 1m achieves a new skill level along with the improvement of the progressing level. More specifically, the CPU 1m judges that the skill level of the user to be 'working intermediate class' by the means that the user 'Shop assistant A' correctly completes 'Two customers' of the training course. Currently, the CPU 1m updates the training situation database by the means that the record of the information field relevant to the skill level in the data record of the 'Shop assistant A' recorded in the information field of the username is changed to be 'working intermediate class' from 'working primary class' as shown in FIG. 4 for instance.

And then, the CPU 1m returns to Act S2 and displays the course selecting image. Currently, the CPU 1m generates the course selecting image according to the information recorded in the latest training situation database. Therefore, the redisplayed course selecting image is the image as shown in FIG. 13 if the training situation database is updated according to the embodiments.

Figure 13:
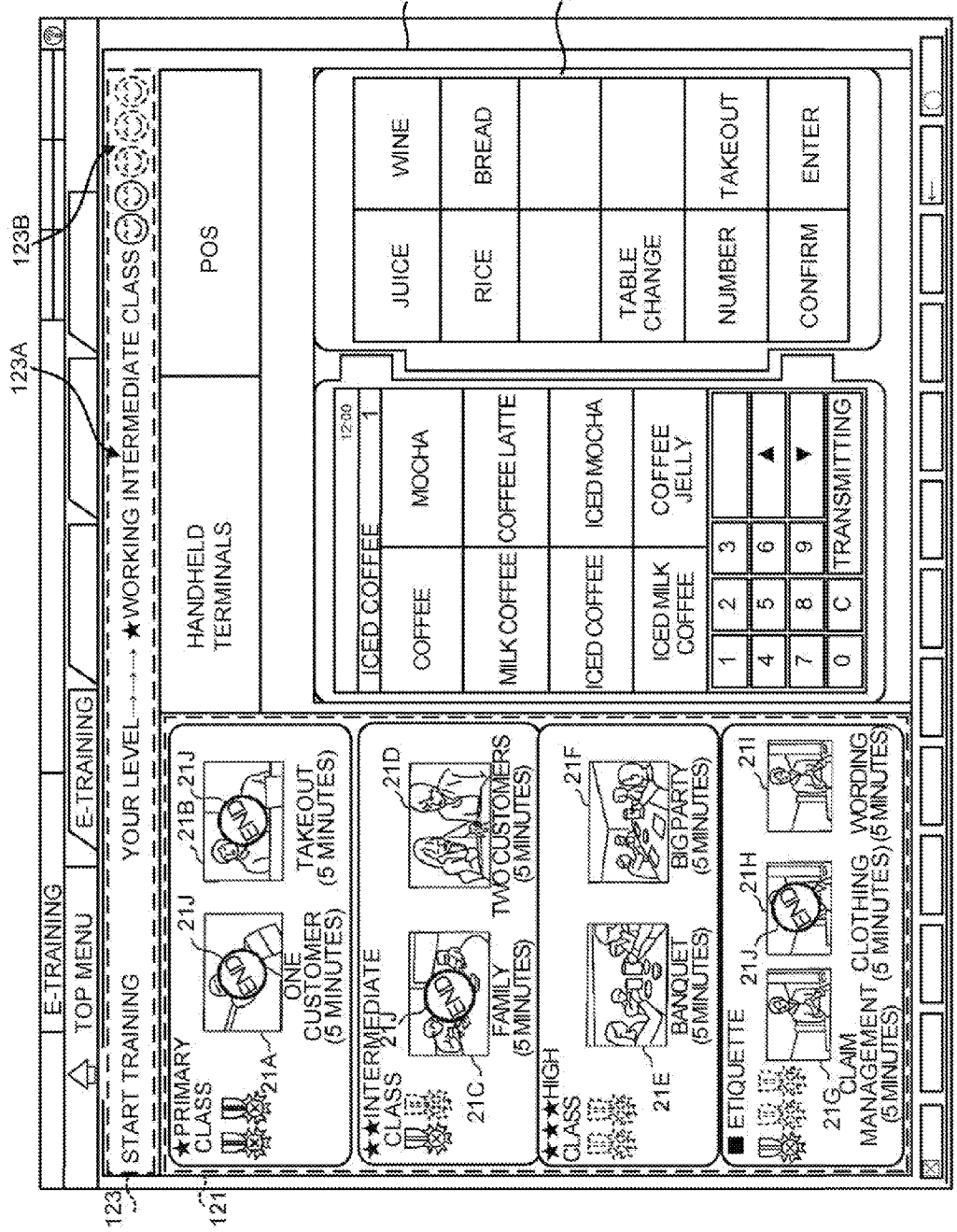
FIG. 13 is a diagram showing an example which includes a display picture of a course selecting image.

In the course selecting image 120 as shown in FIG. 13, the course browsing image 121 is different from the course browsing image 21 as shown in FIG. 5 at the point that the course browsing image 121 comprises the end mark 21j under the state that the dynamic image thumbnail 21b is overlapped. Furthermore, in the course selecting image 120, the guidance image 123 is different the guidance image 23 at the point that the guidance image 123 comprises the alphabetic string 123a and the mark 123b showing the changed skill level.

In Act S11, the CPU 1m turns into Act S2 from Act S11 if the menu items are discovered to be inconsistent (Act S11 is unavailable). Currently, the course selecting image 20 as shown in FIG. 5 is displayed if the training situation database is not updated.

In addition, in the embodiments, the first regenerating unit 61 and the second regenerating unit 62 can regenerate the dynamic image file (the dynamic image) and can continuously regenerate a plurality of still images in the manner of picture browse.

In addition, the input interface image 22 also can be replaced by the input interface image displayed in the LCD 1a when the information terminals 2 are used as a plurality of POS (point-of-sale) terminals. Furthermore, the user can train the operation of the POS terminals if the input interface image is input.

The information terminals 1 with the training function also can execute the processing which is different from the processing without the processing relevant to various services such as the guidance service, the ordering service, the assistant (set on the table) service or the settlement service, etc.

The user operation taken as the training object is not limited to the operation for inputting the order. In addition, the phenomena taken as the operation opportunity are also different consequently if the user operation taken as the training object is different. Therefore, the dynamic image or the still image which corresponds to the opportunity phenomena of the user operation taken as the training object is displayed. Furthermore, the user interface image also corresponds to the user operation which is taken as the training object.

Furthermore, the action also can be realized by a training system which comprises a plurality of terminal devices and a plurality of server devices. Currently, one server device also can be used for processing the training of the user of at least one of the terminal devices, and the terminal devices also can be used for processing the training of the user of at least one of the terminals devices respectively.

Furthermore, the training system can be realized by the cloud computing. More specifically, the form adaptability is provided by software which is called as software as a service (SaaS).

Figure 14:
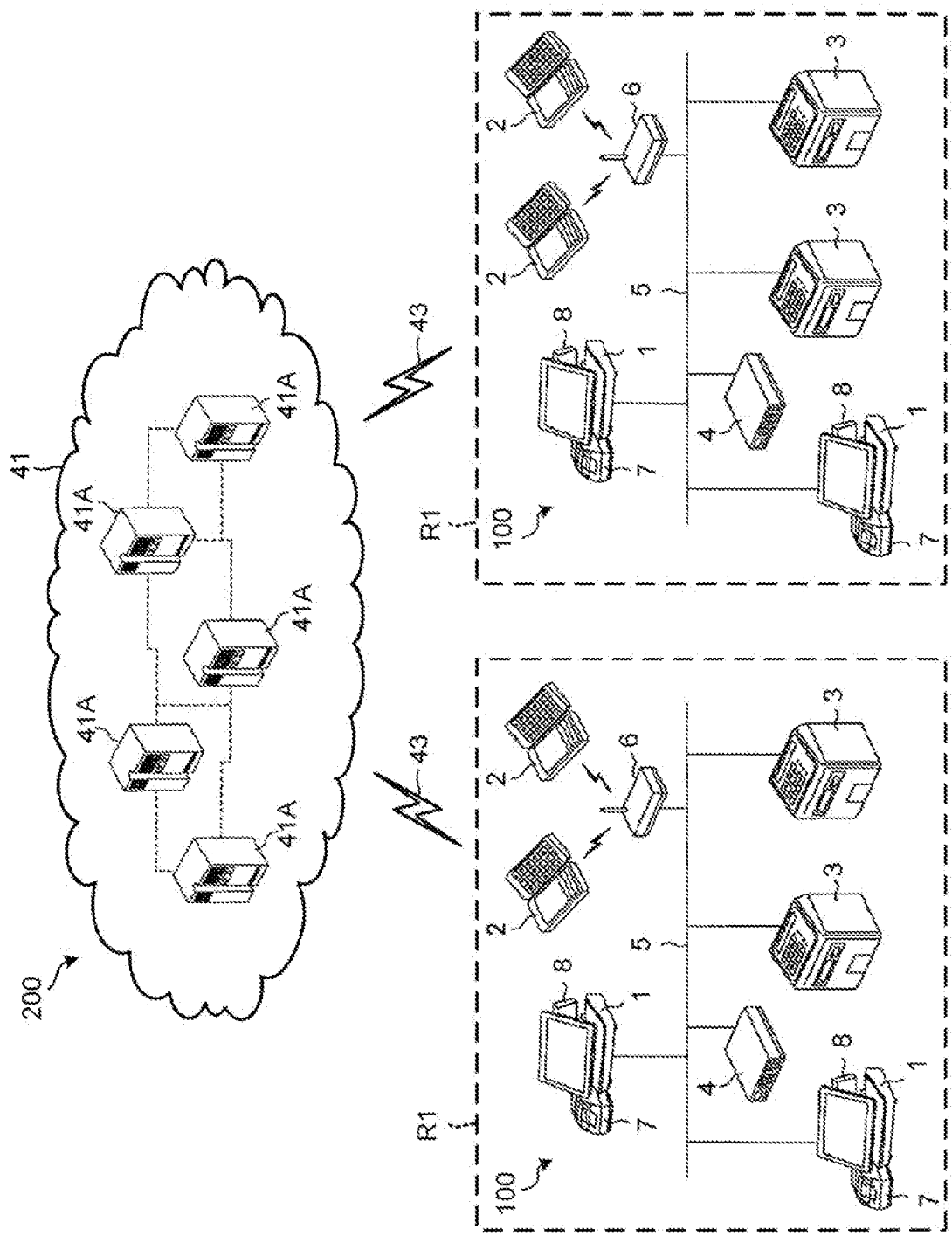
FIG. 14 is a diagram showing the structure of a training system which utilizes a cloud system.

FIG. 14 is a diagram showing the structure of a training system 200 which utilizes a cloud system. The cloud 14 comprises the server devices 41*a*, wherein each server device 14*a* can be communicated with each other. Furthermore, the cloud 14 also can be configured to be one server device 41*a*.

Furthermore, an order processing system 100 (100*a*, 100*b* . . . ) disposed in each shop R1, R2 . . . is connected with the cloud 42 by a communication network 43. In addition, the shops and the order processing system 100 also can comprise only one cloud 41. Furthermore, each device (such as the information terminals 1) of the processing system 100 can be communicated with the cloud 41 by the communication network 43.

The communication network 43 can properly utilize the internetwork, the private network, the next generation network (NGN) or the mobile network, etc.

Furthermore, in the training system 200, each processing recoded in FIG. 12 also can be executed in any one of the cloud 41 and the order processing system 100. Furthermore, when each processing is executed by the cloud 41, the processing also can be executed in single service device 41*a* of the cloud 42 or can be executed in the server devices 41*a* respectively. However, the input and the like of identification formation used for identifying the user in Act S1 is optimally executed in the information terminals 1 of the order processing system 100.

The programs of the embodiments are completely of partially memorized by the memorizing units of the information trinomials 1. Or, the programs of the embodiments also can be memorized by a memorizing unit of the cloud 41 and can be read by the information terminals from the memorizing unit of the cloud 41 via the communication network 43.

In addition, the programs of the embodiments can be previously edited in the ROM to be provided. The programs of the embodiments also can be configured to an installable file or an executable file to be memorized in a readable memory medium of a computer such as the CD-ROM (compact disc read-only memory), the FD (floppy disk), the CD-R (compact disk-recordable), the DVD (digital versatile disk) and the like so as to be provided.

Furthermore, the programs of the embodiments also can be configured to be memorized in the computer which is connected with the network such as the internetwork and the like and is downloaded from the network to be provided. Furthermore, the programs of the embodiments also can be configured into the network such as the internetwork and the like to be provided.

Therefore, according to the embodiment, the review image 40 is regenerated after the training is ended. In the review image 40, the training of the user can be reviewed as the normal operation which should be executed by the user is displayed due to the linkage with the dynamic image 31*a*, so that the skilled operation of the input device (such as the handheld terminals 2) can be simply realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training device, comprising:
a memory configured to store computer executable instructions;
a processor configured to execute the computer executable instructions to perform operations comprising;
storing data which is relevant to a training course for a user to train operations of an input device other than the training device, wherein the training course leads the user to train, on a user interface of the input device on which a plurality of buttons for inputting the operations to the input device are provided, an operation to one of the buttons;
regenerating at least one of an image and a voice for training during the training course, the at least one of the image and the voice for training showing a plurality of phenomena that an opportunity that the user should perform an operation to one of the buttons is changed along with time, the at least one of the image and the voice for training not identifying one of the buttons to be normally operated by the user and the at least one of the image and the voice for training not instructing the user to operate the identified one of the buttons;
accepting an operation to one of the buttons by the user in response to the at least one of the image and the voice for training from a simulated user interface which simulates the user interface of the input device during training;
regenerating the at least one of the image and the voice for training when the training is ended; and
instructing a normal operation to an one of the buttons by the user to the user by outputting at least one of an image and a voice indicating the normal operation to one of the buttons by the user in response to the at least one of the image and the voice for training, in parallel to the regenerating when the training is ended.

2. The training device according to claim 1, wherein accepting the user operation by selectively selecting an image displayed on the simulated user interface; and the normal operation instructing unit is configured to instruct the normal operation to the user by emphatically displaying the image which should be selectively operated by the user in the simulated user interface image.

3. The training device according to claim 1, wherein
regenerating the image for training by regenerating a dynamic image or continuously regenerating a plurality of still images; and
displaying emphatically the image which should be selectively operated by the user according to a memorizing unit which is configured to lead a regenerating time of an image for training to correspond to the image emphatically displayed within the regenerating time to be memorized.

4. A method, comprising:
storing data which is relevant to a training course for a user to train operations of an input device other than the training device, wherein the training course leads the user to train, on a user interface of the input device on which a plurality of buttons for inputting the operations to the input device are provided, an operation to one of the buttons;
regenerating at least one of an image and a voice for training during the training course, the at least one of the image and the voice for training showing a plurality of phenomena that an opportunity that the user should perform an operation to one of the buttons is changed along with time, the at least one of the image and the voice for training not identifying one of the buttons to be normally operated by the user and the at least one of the image and the voice for training not instructing the user to operate the identified one of the buttons;
accepting an operation to one of the buttons by the user in response to the at least one of the image and the voice for training from a simulated user interface which simulates the user interface of the input device during training;
regenerating the at least one of the image and the voice for training when the training is ended; and
instructing a normal operation to one of the buttons by the user to the user by outputting at least one of an image and a voice indicating the normal operation to one of the buttons by the user in response to the at least one of the image and the voice for training, in parallel to the regeneration for regenerating at least one of the image and the voice for training when the training is ended.

5. A training system includes at least one of a server device and a training device, at least one of the server device and the training device, comprises:
a memory configured to store computer executable instructions;
a processor configured to execute the computer executable instructions to perform operations comprising:
storing data which is relevant to a training course for a user to train operations of an input device other than the training device, wherein the training course leads the user to train, on a user interface of the input device on which a plurality of buttons for inputting the operations to the input device are provided, an operation to one of the buttons;
driving the training device to regenerate at least one of an image and a voice for training during the training course, the at least one of the image and the voice for training showing a plurality of phenomena that an opportunity that the user should perform an operation to one of the buttons is changed along with time, the at least one of the image and the voice for training not identifying one of the buttons to be normally operated by the user and the at least one of the image and the voice for training not instructing the user to operate the identified one of the buttons;
accepting an operation in the training device to one of the buttons by the user in response to the at least one of the image and the voice for training from a simulated user interface which simulates the user interface of the input device during training;
driving the training device to regenerate the at least one of the image and the voice for training when the training is ended; and
instructing a normal operation to one of the buttons by the user to the user by driving the training device to output at least one of an image and a voice indicating the normal operation to one of the buttons by the user in response to the at least one of the image and the voice for training, in parallel to the driving regeneration when the training is ended.

6. A control method of a training system which includes at least one of a server device and a training device, comprises:
storing data which is relevant to a training course for a user to train operations of an input device other than the training device, wherein the training course leads the user to train, on a user interface of the input device on which a plurality of buttons for inputting the operations to the input device are provided, an operation to one of the buttons;
driving the training device to regenerate at least one of an image and a voice for training during the training course, the at least one of the image and the voice for training showing a plurality of phenomena that an opportunity that the user should perform an operation to one of the buttons is changed along with time, the at least one of the image and the voice for training not identifying one of the buttons to be normally operated by the user and the at least one of the image and the voice for training not instructing the user to operate the identified one of the buttons;
accepting an operation in the training device to one of the buttons by the user in response to the at least one of the image and the voice for training from a simulated user interface which simulates the user interface of the input device during training;
driving the training device to regenerate the at least one of the image and the voice for training when the training is ended; and
instructing a normal operation to one of the buttons by the user to the user by driving the training device to output at least one of an image and a voice indicating the normal operation to one of the buttons by the user in response to the at least one of the image and the voice for training, in parallel to the regeneration for regenerating at least one of the image and the voice for training when the training is ended.

7. The training device according to claim 1, wherein
the input device is configured to receive an input of a menu item ordered from a customer by the user's operations of the operation buttons.

* * * * *